Figure 1:
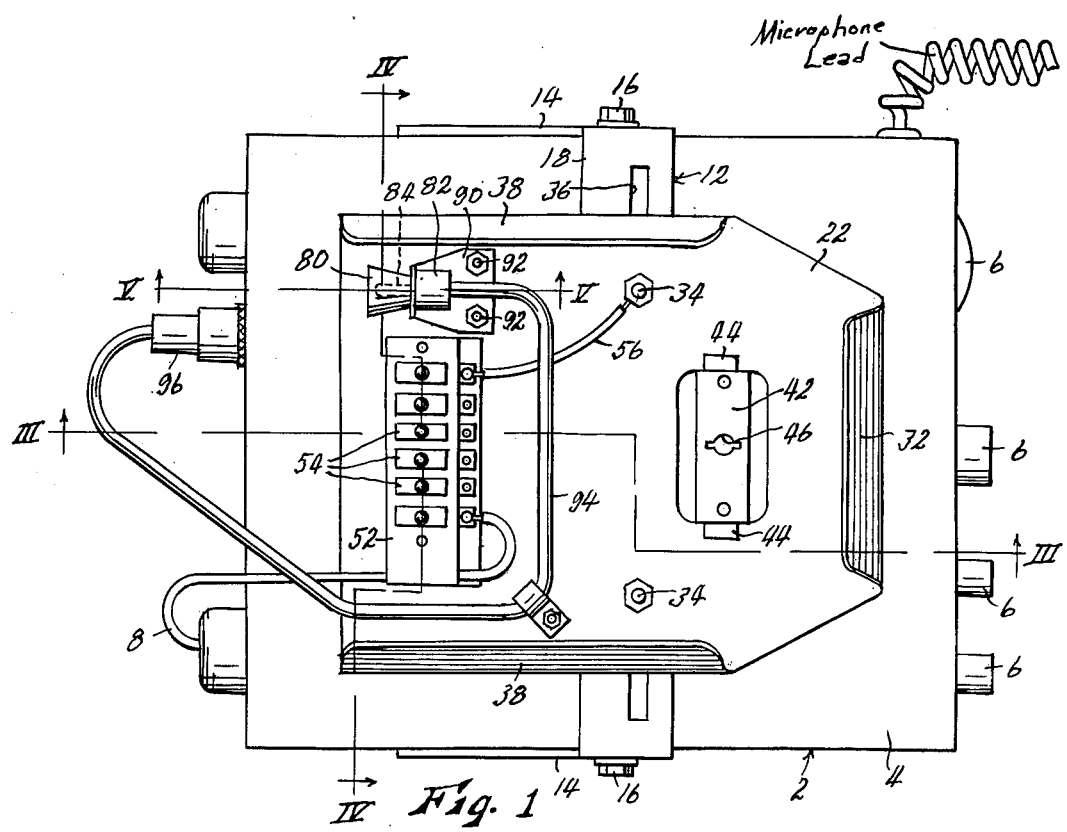

United States Patent [19]

Berning

[11] 4,050,767
[45] Sept. 27, 1977

[54] AUTOMOBILE MOUNT FOR CITIZENS BAND RADIOS

[76] Inventor: Keith E. Berning, R.R. No. 1, Cosby, Mo. 64436

[21] Appl. No.: 711,868

[22] Filed: Aug. 5, 1976

[51] Int. Cl.² .......................................... H01R 17/18
[52] U.S. Cl. ............................. 339/135; 174/DIG. 9; 325/353; 339/10; 339/91 R; 339/177 R
[58] Field of Search ............. 339/10, 65, 66 R, 66 M, 339/49 R, 119 R, 120, 135, 177 R, 177 E, 91 R; 317/101 CB; 174/DIG. 9; 325/312, 353, 355, 356, 357

[56] References Cited

U.S. PATENT DOCUMENTS

| 3,369,214 | 2/1968 | Krumreich | 339/91 R |
| 3,513,478 | 5/1970 | Kemper | 339/135 |

FOREIGN PATENT DOCUMENTS 965,504  6/1957  Germany ............................. 339/120

Primary Examiner—Roy Lake
Assistant Examiner—Mark S. Bicks
Attorney, Agent, or Firm—John A. Hamilton

[57] ABSTRACT

A mount for detachably installing a citizens' band radio in an automobile consisting of a two-part slide one element of which is affixed to the radio and the other to structure of the automobile to permit ready detachment of the radio, the slide elements carrying contact sets contacting when the slide elements are engaged to supply electrical connections to the radio, one of the sets of contacts being of special construction to furnish an electrically shielded antenna lead to the radio.

7 Claims, 5 Drawing Figures

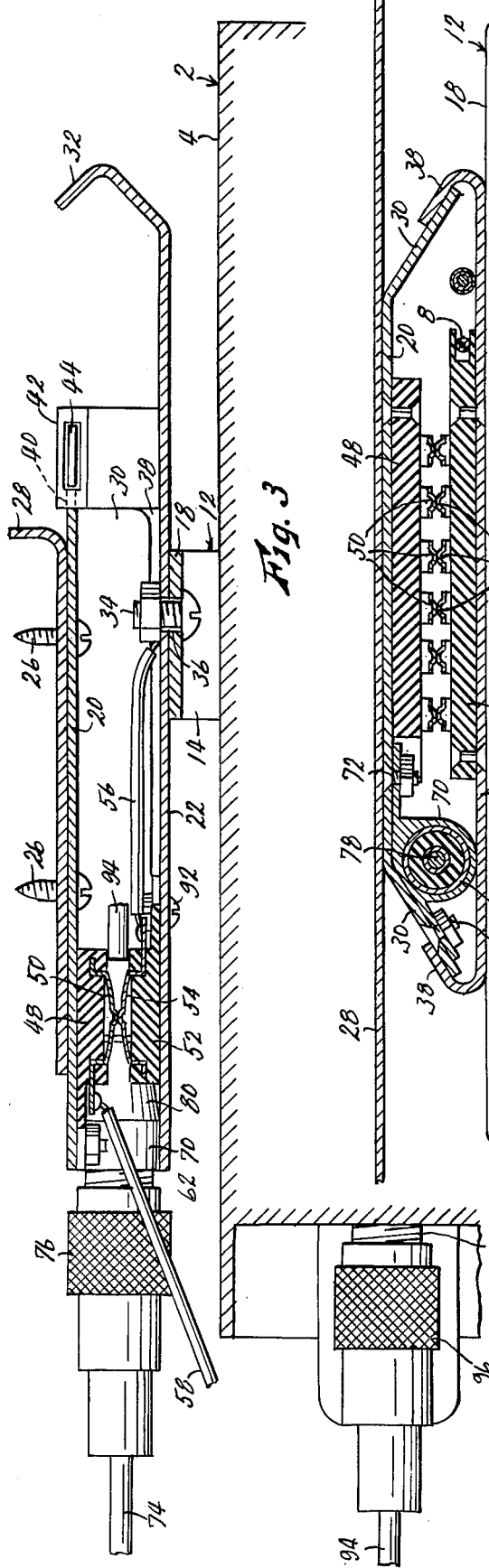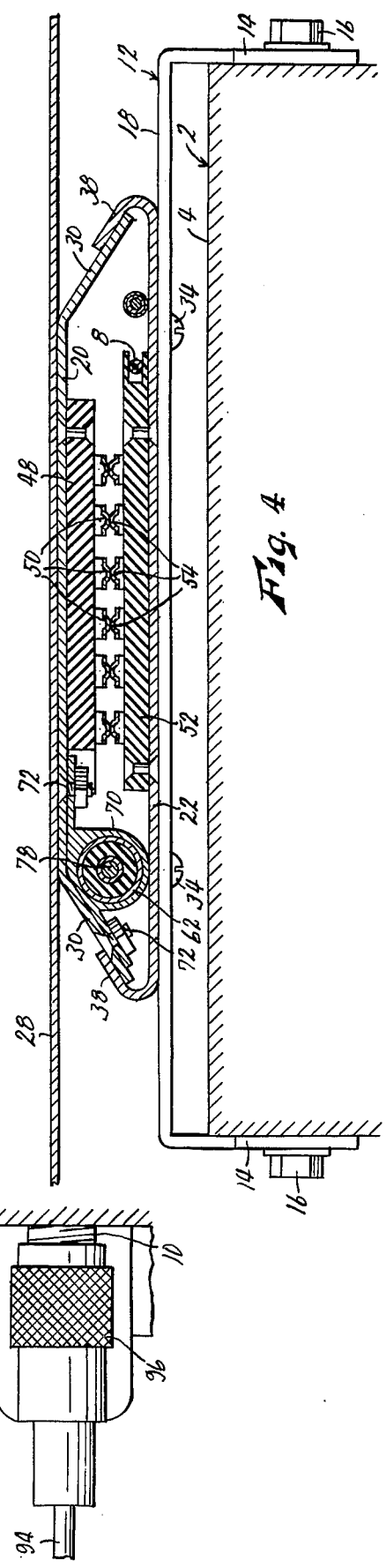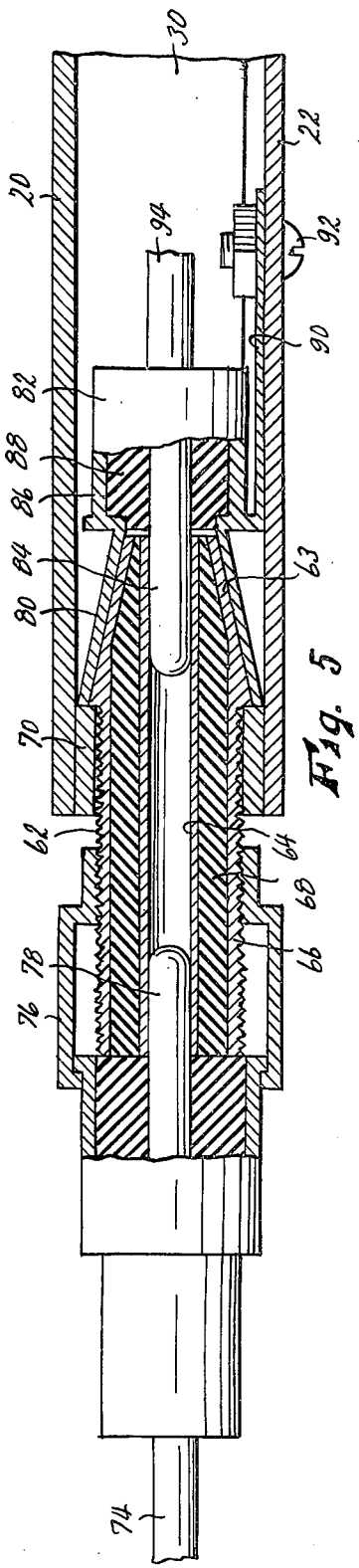

AUTOMOBILE MOUNT FOR CITIZENS BAND RADIOS

This invention relates to new and useful improvements in radio mounts for automobiles, and has as its object the provision of a mount capable of permitting detachment of the radio from its mount with a simple sliding movement, all necessary electrical connections to the radio being made and broken automatically by the respective engagement or disengagement of the slide.

Since the advent of the wide popularity of CB radios for use in automobiles, it is well known that such radios have also become very popular targets for thieves, said radios being rather expensive and having a resale value sufficiently high to render them profitable to the thief. The theft of such radios has become so common that many automobile insurance companies except the radios from the coverage offered by their policies. No mounting by which the radios are affixed in automobiles, though the mountings are often equipped with good-quality key locks, appears to be sufficiently secure to prevent theft by a determined burglar. Consequently, there has been developed a slide mount which permits relatively easy detachment of the radio from the automobile, in order that the owner either may carry it with him, many such radios being small enough and sufficiently light weight to make this procedure practical, or may conceal and protect it by placing it in the locked trunk compartment of the vehicle. However, while such prior slide mounts have heretofore been provided with various contact sets capable of making and breaking most of the necessary electrical connections to the radio as the slide is respectively engaged and disengaged, this has not been true in the case of the antenna lead to the radio. The antenna lead must be electrically shielded throughout its length, by means of a grounded conducting shield surrounding it, to prevent electrical interference with the signal, and to prevent mismatching of impedances. Contacts previously used in slide mounts for mounting car radios have been exposed to greater or lesser extent at and adjacent their points of engagement, usually in close proximity to other conductors and other electrical fields, and consequently not been shielded, and are not satisfactory for use in supplying the antenna lead connection. Consequently, the antenna lead connection, usually consisting of a union-type pin and socket connector, has necessarily been connected and disconnected manually. This manual operation is not difficult, but nevertheless is somewhat tedious, with the radio that owners, often in a hurry, neglect to detach the radio, and the thefts continue.

Accordingly, the primary object of the present invention is the provision of a radio slide mount of the character described having a special set of contacts which provide a fully shielded antenna lead connection, but which also may be engaged and disengaged automatically by engaging or disengaging the slide. This permits rapid and easy demounting of the radio, including the severing of all electrical connections, simply by pulling the slide element connected to the radio.

The necessity of shielding of the antenna lead contacts generally necessitates the use of a pin and socket connector, the elements of which are mounted respectively on the two elements of a two-element slide mount. The pin and socket must engage by longitudinal sliding movement, and this creates the problem that a slight misalignment of the slide elements could prevent proper engagement of the pin and socket. Therefore, another object is the mounting of either the pin or the socket on its associated slide element for laterally yieldable movement, and the provision of a "finder" means operable to deflect the yieldable element into proper alignment with the other element of the connector.

Other objects are simplicity and economy of construction, and efficiency and dependability of operation.

Figure 2:
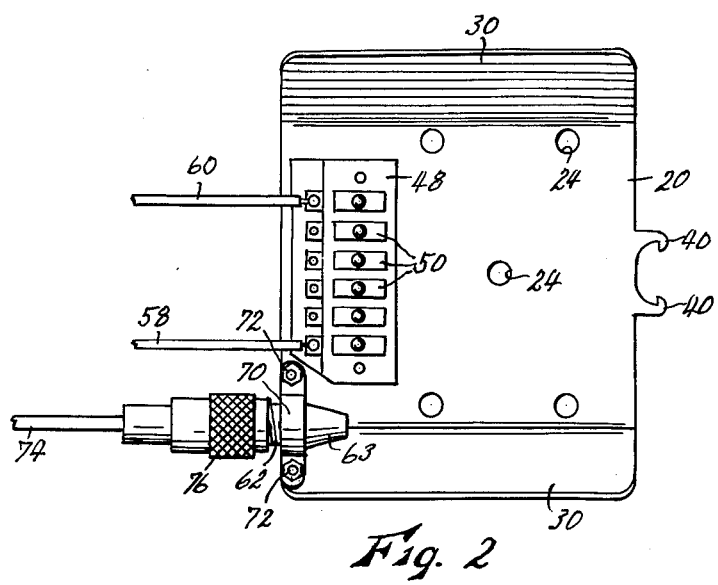

With these objects in view, as well as other objects which will appear in the course of the specification, reference will be had to the accompanying drawing, wherein:

FIG. 1 is a top plan view of a radio case, showing the case-mounted elements of a mount embodying the present invention applied operatively thereto, FIG. 2 is an inverted plan view of the automobile-mounted elements of the mount, FIG. 3 is an enlarged sectional view taken on line III—III of FIG. 1, showing the mount elements assembled in normal relation and mounted in an automobile, FIG. 4 is an enlarged sectional view taken on line IV—IV of FIG. 1, also showing the mount elements assembled in normal relation, and FIG. 5 is a still further enlarged fragmentary sectional view taken on line V—V of FIG. 1.

Like reference numerals apply to similar parts throughout the several views, and the numeral 2 applies generally to a CB radio, the case 4 of which is generally rectilinear, having its controls 6 at its front and its power lead wire 8 and its antenna lead connection 10 entering at its back. Other details of the radio itself are not pertinent to the present invention.

The mount forming the subject matter of the present invention includes a metal yoke 12 of inverted U-shape, the vertical legs 14 thereof depending along the sides of case 4 and being affixed thereto by screws 16, which provide an electrical connection between the yoke and the radio chassis, and the top leg 18 of which extends horizontally and transversely above case 4. The mount also includes upper and lower sheet metal plates 20 and 22, both of which are generally rectangular and disposed generally horizontally, upper plate 20 being provided with screw holes 24 for receiving screws 26 (see FIG. 3) or the like for affixing said plate to some convenient portion of an automobile, such as the bottom of the dashboard panel 28. The parallel side edge portions of plate 20 are angled downwardly and outwardly to form flaps 30. Lower plate 22 extends forwardly of upper plate 20, and its forward edge portion is angled upwardly and inwardly to form a handle 32. Plate 22 is secured to top leg 18 of yoke 12 by bolts 34 inserted through a slot 36 formed longitudinally in said yoke leg, and the parallel side edge portions of said plate are angled upwardly and inwardly to form flaps 38. Thus plate 22 may be moved rearwardly, engaging flaps 38 thereof above flaps 30 of upper plate 20, and moving the lower plate slidably to the rear until the flaps are fully engaged as shown in FIG. 3. The radio is thus securely mounted in the automobile. The central portions of plates 20 and 22 are then parallel, but vertically spaced apart.

When plates 20 and 22 are fully engaged as just described, latch fingers 40 formed at the forward edge of plate 20 enter into a lock body 42 mounted on the forward portion of plate 22, and are secured therein by latch means which are releasable by pressing finger tabs 44 projecting from the lock body. The finger tabs may be deactivated by means of a key insertable in a keyhole 46 of the lock body. The lower plate, carrying te radio, is thus nominally locked against detachment from the automobile. However, no locking device within my knowledge is strong enough to withstand a determined thief, who could, even if the lock held, simplytear the entire mount, lock and all, free from the dashboard.

Mounted rigidly to the lower surface of top plate 20 is an insulating block 48 in which are disposed a series (6 shown) of spring contacts 50 spaced laterally of the plate. Similarly, an insulating block 52 fixed to the upper surface of lower plate 22 carries a matching series of spring contacts 54. Each contact 54 engages the matching contact 50 when plates 20 and 22 are fully engaged as shown in FIG. 3 and 4, but are automatically disengaged when the plates are slidably separated. Only two of these contact pairs are used, as actually shown. One of contacts 54 is grounded to plate 22 at one of bolts 34 by wire 56, and its matching contact 50 has connected thereto a wire 58 which it will be understood is grounded to the automobile frame. This grounds the radio chassis, it being understood that the dashboard 28 is often of non-conducting material. Another of contacts 54 has the power lead wire 8 of the radio connected thereto, and the contact 50 matching this contact 54 has connected thereto a wire 60 which is connected to a suitable source of electric power, normally the twelve volt electrical system of the automobile. The remaining sets of contacts 52–54, shown blank, may be utilized for various purposes not pertinent to the present invention such as for leads to external speakers, a public address system, or the like.

However, contact sets 52–54 are not satisfactory for use in connecting the necessary antenna lead to the radio, since they are exposed and hence subject to electrical interference, mismatching of electrical impedances and the like. Instead, the antenna lead must be shielded along its entire length by a conducting sheath surrounding it and effectively grounded. For this purpose, there is employed a double-ended socket connector 62, female at both ends, comprising as best shown in FIG. 5 a central conducting tube 64, and an outer conducting tube shield 66 separated from tube 64 by insulating material 66. Said connector extends parallel to the direction of relative sliding movement of plates 20 and 22, and is rigidly affixed to top plate 20 by means of a bracket 70 fixed to said top plate by bolts 72. The antenna lead 74 from the exterior antenna of the automobile, which constitutes a shielded cable, is connected to the rearward end of female connector 62 by means of the usual union-type fastener 76 which includes a contact pin 78 (see FIG. 5) engageable slidably in the rearward end of central tube 64 of connector 62. Pin 78 is connected to the antenna lead itself, and union 76 is electrically connected to the shield of the antenna lead.

The forward end portion 63 of connector shield 66 is tapered forwardly in conical form, for coaxial engagement in a correspondingly tapered hollow conical guide 80 which forms a part of a connector 82 which includes a pin 84 extending coaxially into socket guide 80 and is adapted to be received slidably in the forward end of central tube 64 of connector 62, guide 80 and the housing 86 being formed of conducting material and separated from pin 84 by insulating material 88, and being affixed to a bracket 90 which is of conducting material and is thin and resilient, being formed for example of spring steel, and affixed to lower plate 22 by bolts 92. Thus a lower plate 22 is moved forwardly in sliding engagement with upper plate 20, pin 84 enters central tube 64 of connector 62. The engagement of connector portions 63 and 80 causes a centering action to bring pin 84 and tube 64 into axial alignment as the engagement of plates 20 and 22 is completed, in the event they might be slightly misaligned, and the resilient yieldability of bracket 90 permits a degree of lateral movement of pin 84 to allow proper engagement thereof in the tube. The engagement of conical guide members 63 and 80 also provides a ground connection for shield 66.

An antenna lead cable 94 is permanently joined to connector 82. Said auxiliary cable is also shielded, its central conductor being connected to pin 84 and its shield connected to housing 86 of the connector, said housing also being grounded by bracket 90 of lower plate 22, which is always at ground potential by reason of wires 56 and 58, as already described. The opposite end of cable 94 is connected to the antenna input 10 of the radio by means of the usual union-type connector 96, similar in all respects to connector 76.

The operation of the mount is believed to have been fully described in connection with the description of its structure. It will be seen that the radio may be detached very rapidly and easily simply by grasping handle 32 of lower pate 22 and sliding said lower plate forwardly out of engagement with upper plate 20, in order that said radio may be carried or otherwise protected while the owner is absent from the automobile. This motion automatically severs all electrical connections to the radio, including that of the antenna lead, with no need for any additional and separate manual operations, and all of said connections are automatically re-established when plates 20 and 22 are re-engaged. Nevertheless, the antenna lead is fully protected by a grounded shield throughout its length, and so is protected against interference with the antenna signal from any cause.

While I have shown and described a specific embodiment of my invention, it will be readily apparent that many minor changes of structure and operation could be made without departing from the spirit of the invention.

I claim:
1. A radio mount for automobiles comprising:
a. a first plate,
b. means for mounting said first plate rigidly in an automobile,
c. a second plate, said second plate being slidably engageable with and disengageable from said first plate,
d. means rigidly affixing said second plate to the case of a radio, and
e. a series of pairs of electrical contacts, the contacts of each pair being mounted respectively on said first and second plates and being positioned to be brought into engagement by sliding engagement of said first and second plates, each of said pairs being operable when engaged to complete an electrical connection from said automobile to said radio, one of said connections being from an antenna mounted on said automobile to the antenna input connection of said radio case, and comprising a first connector mounted on said first plate and constituting a first central conductor surrounded by a first conducting shield separated from said first central conductor, a second connector mounted on said second plate and including a second central conductor surrounded by a second conducting shield separated from said second central connector, the central conductors of said first and second connectors being brought into engagement by sliding engagement of said first and second plates, and electrical connections grounding the shields of both said first and second connectors.

2. A radio mount as recited in claim 1 wherein said electrical connections grounding said connector shields are completed through another of said pairs of contacts to the frame of said automobile.

3. A radio mount as recited in claim 2 wherein the shields of said first and second connectors are brought into electrically conductive engagement when the central conductors thereof are engaged, said conductive engagement serving as an element of the electrical connections grounding said shields.

4. A radio mount as recited in claim 1 wherein said antenna connection further includes:
   a. a first cable interconnecting said antenna with the central conductor of said first connector, and equipped with a conducting shield,
   b. a second cable interconnecting the central conductor of said second connector with the antenna input of said radio case, and equipped with a conducting shield, and
   c. electrical connections grounding the shields of said first and second cables.

5. A radio mount as recited in claim 4 wherein the shield of said first cable is electrically connected to the shield of said first connector, wherein the shield of said second cable is electrically connected to the shield of said second connector, and wherein the shields of said first and second connectors are electrically interconnected when their central conductors are engaged, the electrical connection grounding all of said shields including the electrical connections between said shields and being completed through another of said pairs of contacts to the frame of said automobile.

6. A radio mount as recited in claim 1 wherein the central conductors of said first and second connectors comprise, not necessarily respectively, a pin and socket the axes of which are parallel to the direction of relative sliding movement of said plates, the means mounting one of said connectors to its associated plate being resiliently yieldable laterally of the pin-and-socket axis, whereby to compensate for any slight lateral misalignment of said plates.

7. A radio mount as recited in claim 6 with the addition of correspondingly conically tapered pin and socket formations carried respectively by said first and second connectors, coaxially with the central conductors thereof, and operable to be moved axially into engagement with each other as said second plate is moved slidably into engagement with said first plate, whereby to act as a finder moving the central conductor of the resiliently mounted connector into coaxial alignment with the central conductor of the other connector.

* * * * *